United States Patent [19]

Redlich

[11] Patent Number: 4,864,232
[45] Date of Patent: Sep. 5, 1989

[54] TEMPERATURE COMPENSATION FOR DISPLACEMENT TRANSDUCER

[75] Inventor: Robert W. Redlich, Athens, Ohio
[73] Assignee: Sunpower, Inc., Athens, Ohio
[21] Appl. No.: 330,931
[22] Filed: Mar. 27, 1989

Related U.S. Application Data

[63] Continuation of Ser. No. 164,979, Mar. 7, 1988, abandoned.

[51] Int. Cl.$^4$ .......................... G01B 7/02; G01N 27/72
[52] U.S. Cl. .................................. 324/207; 324/225; 340/870.36
[58] Field of Search ....................... 324/207, 208, 225; 340/870.31, 870.36; 336/130, 136

[56] References Cited

U.S. PATENT DOCUMENTS

| | | | |
|---|---|---|---|
| 3,210,746 | 10/1965 | Clapp | 336/136 X |
| 4,502,006 | 2/1985 | Goodwin et al. | 336/130 X |
| 4,543,732 | 10/1985 | Maples | 324/207 |

FOREIGN PATENT DOCUMENTS

| | | | |
|---|---|---|---|
| 1489185 | 10/1977 | United Kingdom | 324/207 |
| 1558206 | 12/1979 | United Kingdom | 324/207 |

Primary Examiner—Reinhard J. Eisenzopf
Assistant Examiner—Jack B. Harvey
Attorney, Agent, or Firm—Frank H. Foster

[57] ABSTRACT

A temperature compensation structure for a displacement transducer of the type having a coil and an electrically conducting, non-ferromagnetic wall moving in telescoping relationship with the coil and excited by a signal at a sufficiently high frequency so that skin effect in the wall permits wall displacement to vary the reluctance of the coil flux path and thereby vary its inductance proportionally to displacement. The improvement provides temperature compensation for and essentially eliminates variation in the electrical scale factor which is caused by change in the temperature of the transducer. The improvement is to interpose between the coil and the core of the transducer a wall which has a thickness which is small compared to the skin depth of the wall material at the operating frequency of the device. This wall operates as a reluctance which varies as a function of temperature to vary the flux intensity in the coil as a function of temperature in a manner to negate variations in transducer output voltage as a function of temperature.

7 Claims, 1 Drawing Sheet

TEMPERATURE COMPENSATION FOR DISPLACEMENT TRANSDUCER

This is a continuation of application Ser. No. 07/164,979 filed Mar. 7, 1988, now abandoned.

TECHNICAL FIELD

This invention relates generally to an improvement of a displacement transducer of the type having a coil and an electrically conducting, non-ferromagnetic wall moving in telescoping relation with the coil and excited by a signal at a sufficiently high frequency that skin effect in the wall permits wall displacement to vary the reluctance of the coil flux path and thereby vary its inductance proportionally to displacement. More particularly, this invention relates to a structural improvement which compensates for and essentially eliminates variations in the electrical scale factor caused by changes in the temperature of the transducer.

BACKGROUND ART

A linear displacement transducer of this type is shown in my previous U.S. Pat. No. 4,667,158 and is illustrated in FIG. 1. The transducer is a helical coil 2 of an electrical conductor wound at a uniform pitch on a cylindrical thin-walled tube or bobbin 1. Ordinarily the bobbin 1 is constructed of an electrical insulator. Preferably, the tube also has suitable properties for use as a dry bearing surface. The helical coil 2 is fixed to the first of two relatively movable bodies for which the relative displacement is to be measured.

A non-ferromagnetic, electrically conducting rod or preferably a tube forms a core 3 which is slidable within the bobbin 1. It is made, for example, of aluminum or copper and is fixed to the second of the two relatively moving bodies.

Preferably the coil is surrounded by a low and constant reluctance path so that changes in coil inductance with respect to core 3 movement is maximized. This is preferably accomplished by positioning a material, such as ferrite 5, having a high magnetic permeability, but low electrical conductivity surrounding the coil. This material provides the desired low magnetic reluctance while not permitting the formation of significant eddy currents and not exhibiting a substantial skin effect.

Preferably this high permeability, low conductivity material is itself surrounded with a tubular shield 4 of high electrical conductivity to confine the field of the coil to the ferrite 5 and the skin layer of the shield 4 and to prevent external fields from linking with the coil 2. The shield 4 confines the magnetic flux generated from stray fields by the current in the coil 2 and shields it over a wide frequency range. It is preferably made of a material having both high electrical conductivity and high magnetic permeability, such as soft iron or low carbon steel.

An AC electrical energy source 6 and a detector circuit means 7, preferably in the form of a bridge circuit, are electrically connected to the coil 2. The AC source 6 operates at a frequency, preferably in the range of 50–200Khz, which may be designated a carrier frequency $f_c$. An important key to the efficient and effective operation of a transducer of this type is that the frequency of the source 6 be high enough that the skin depth in the core 3 is substantially less than the radius of the core and less than the thickness of the wall of the tube.

The source 6 drives the coil through a resistor 8 which has a resistance which is much greater than the inductive reactance of the coil and its associated structures so that effectively the transducer is driven by a current source. Therefore, the voltage across the transducer coil 5 is approximately $(V/R)*(2 \pi f_c L)$.

The detector circuit 7 detects a signal at an AM detector 9 which is proportional to the inductance of the coil 2 and its associated structures. The coil voltage is proportional to coil inductance, which in turn is proportional to the displacement of the core 3.

In the operation of the basic concept of the displacement measurement apparatus of FIG. 1, the AC source 6 excites the bridge circuit, including the transducer coil 2 in one of its branches. Because of the skin effect at the frequency at which the AC source 6 is operating, magnetic fields in the core 3 are confined to a thin layer approximately equal to the sum of the skin depth in the core material which is typically on the order of 0.25 millimeters thick plus the spacing from the exterior of the core 3 to the interior of the coil 2. Because the skin depth is considerably less than the radius of the core, the magnetic flux is confined to a path in the region of the core 3 which has a considerably smaller cross-sectional area than the flux path where there is no core 3. Since reluctance is inversely proportional to the cross-sectional area of the flux path, the core 3 has the effect of substantially increasing the reluctance and therefore substantially reducing the magnetic flux in the region of the core. With the core 3 partially inserted in the coil 2 of the transducer, the interior of the coil 2 can be divided into the region occupied by the core 3 where magnetic flux is low, and the region unoccupied by the core where magnetic flux is relatively high compared to the core region. Therefore, the flux linkages of the coil are substantially reduced as a result of the insertion of the core and are reduced in proportion of the extent of the insertion of the core within the coil 2. This, in turn, proportionally reduces the self inductance of the coil 2. Thus, the movable core varies the self inductance and the impedance and therefore varies the voltage across the transducer in proportion to its displacement.

While a great variety of detector circuits are known to those skilled in the art for detecting a signal which is proportional to the changes in coil inductance or voltage, the detector circuit of FIG. 1 operates well. A bridge is designed to be brought into AC amplitude balance by adjustable resistor 10 when the core 3 is centered within the coil 2. The AC source 6 is a signal at a frequency $f_c$. The amplitude of the transducer signal at frequency $f_c$ at the node 11 of the bridge is proportional to the displacement of the core 3. The amplitude of the balance signal at frequency $f_c$ at the opposite node 12 is adjusted so that it is equal to the amplitude of the transducer signal at node 11 when the core 3 is centered within the coil 2. A detector circuit means comprising two AM detectors 9A and 9B and a differential amplifier 14 is provided to detect the difference between the modulation amplitudes at the nodes 11 and 12.

The displacement of the core 3 is effectively providing an amplitude modulated signal at the terminal 11, the amplitude of which is proportional to displacement of the core 3 and may be detected by the AM detector 9B to provide an output signal which is directly proportional to the displacement of the core 3. The balance signal at node 12 is detected by an AM detector circuit 9A. The output signals from the two AM detectors 9A and 9B are applied to a differential amplifier 14, the output of which provides a signal $V_{out}$ which is proportional to the displacement of the core 3. Further details of the basic concept are described in more detail in my above cited U.S. Patent.

One difficulty with a displacement transducer of the above described type arises because skin depth is a function of temperature. As the temperature of a conductor rises, its resistivity increases so that it becomes a poorer conductor or a better insulator. As a result, the alternating field penetrates the material deeper and therefore its skin depth becomes greater. The ultimate result is that the scale factor, which ideally is a constant of proportionality relating linear displacement to output signal voltage, varies with temperature. Although normally encountered temperature variations in some application environments may cause errors on the order of 1%–5%, such an error is substantial in view of the high accuracy applications of transducers of this type.

It is therefore an object and feature of the present invention to structurally improve a transducer of the above type so that it will be self compensating for changes in skin depth as a function of temperature and to thereby eliminate any variation in the scale factor of a displacement measurement apparatus of the above type which is a function of temperature.

BRIEF DISCLOSURE OF INVENTION

The wall of the bobbin 1, shown in FIG. 1, which is interposed between the coil 2 and the core 3, is formed of an electrically conducting, non-ferromagnetic material which has a bobbin wall thickness which is small compared to the skin depth of the bobbin wall material at the operating temperature and frequency of the measurement device. For ideal compensation, the thickness of the bobbin wall is constructed in accordance with the equation:

$$t = z\left[\frac{(-1)}{S}\frac{dS}{dT} / \frac{1}{z}\frac{dz}{dT}\right]$$

wherein:
z = skin depth of the bobbin material at the selected design operating frequency and at a temperature;
S = the axial cross-sectional area of a polygon having the same shape as the core but reduced in size by the skin depth at the selected design operating frequency and temperature; and
T = temperature.

Figure 1:
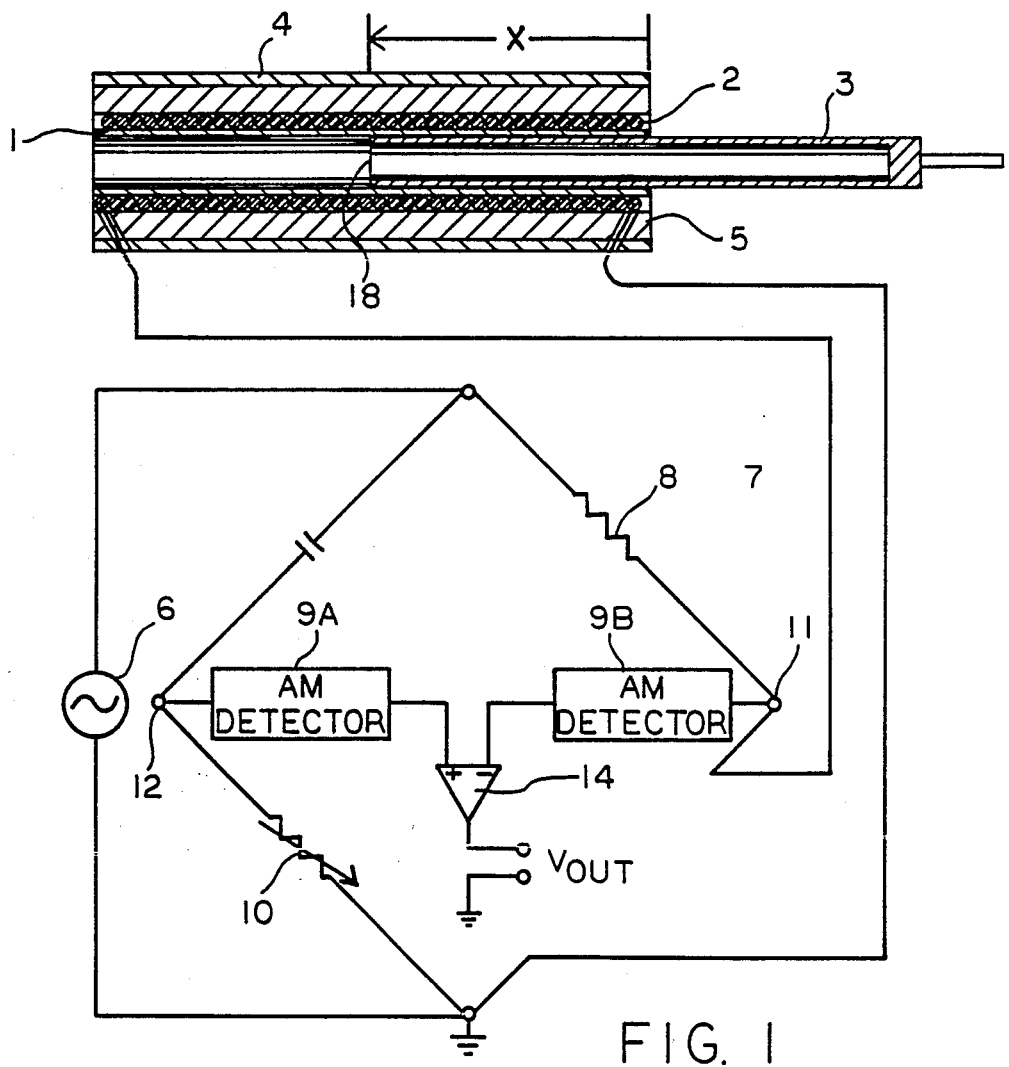
FIG. 1 is a diagrammatic view of the preferred embodiment of the invention showing the transducer in axial section and a schematic diagram of the detection circuitry. It is structurally like the prior art of the above cited patent except for the thickness and material of the bobbin 1.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Referring to FIG. 1, in embodiments of the structure of FIG. 1, it is the function of the core 3 to greatly increase the reluctance of that portion of the interior of the coil 2 which the core occupies. The core excludes the flux from most of the coil interior because the flux can only penetrate to the skin depth of the core.

Any variation in the axial cross-sectional area of the core 3 will vary the volume within the coil 2 which is occupied by the core and will therefore, in turn, vary the reluctance interposed in the interior flux path by the core. For example, if the radial dimension of the core would decrease, its effect in increasing the reluctance where it is located within the coil would also decrease and therefore the change in output voltage $V_{out}$ would be reduced for each unit of axial displacement of the core 3.

Since skin depth is a function of temperature, an increase in the temperature of the core 3 results in an increase in its skin depth and therefore a decrease in its effective radial dimension, resulting in a decrease in its effective cross-sectional area. This decrease in its effective, electrical, cross-sectional area means that each linear unit of core displacement will result in a reduced change in the output voltage $V_{out}$.

Figure 2:
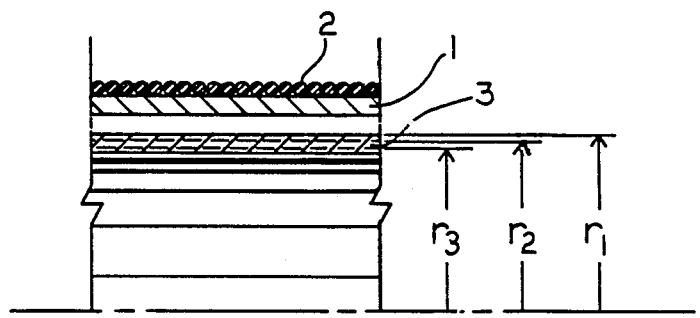
FIG. 2 is a view in axial section of a segment of the transducer illustrated in FIG. 1.

For example, in FIG. 2 the physical dimension of the cylindrical core 3 may be designated R1. At ordinary operating temperature its effective radius is R2 if its skin depth is R1–R2. However, at increased operating temperature, its skin depth may increase so that its effective radius decreases to R3. The dimensions shown in FIG. 2 are necessarily exaggerated to illustrate the effect which is proportionally much less than is illustrated.

Output voltage $V_{out}$ is a function of magnetic field intensity within the core. Changes in output voltage are therefore a function of changes in magnetic field intensity. Thus, a greater magnetic field produces a greater output voltage and as a consequence, produces greater changes in output voltage per unit of linear displacement of the core 3.

The present invention increases the magnetic field intensity within the coil 2 in proportion to the decrease in the effective cross-sectional area of the core 3 as the temperature increases. Inverse changes are made for temperature decreases.

This is accomplished by forming the coil form or bobbin 1 of an electrically conducting, non-ferromagnetic material instead of forming it of an insulating material which is ordinarily used as a coil form. However, the thickness of the bobbin wall is of critical importance in that it must be small as compared to the skin depth of the bobbin wall material at the operating or carrier frequency of the measurement apparatus described above. One material that has been found to work well is stainless steel. Other suitable materials include Titanium, Bismuth, and Germanium.

Since the skin depth of the bobbin wall is considerably greater than the physical thickness of the bobbin wall, a substantial flux will pass through it so that the transducer can operate as explained above. However, since the skin depth of the bobbin material will also vary as a function of temperature, increasing as the temperature increases, the bobbin behaves as a variable reluctance which varies as a function of temperature. As temperature increases, its skin depth increases and therefore its reluctance decreases permitting more flux in the interior of the bobbin 3.

The result is that as temperature increases and therefore the effective cross-sectional dimension of the core 3 shrinks, thereby tending to reduce the change in output voltage $V_{out}$ per linear unit of displacement of the core 3, the bobbin material correspondingly permits more flux to pass into the interior of the core, thereby increasing the voltage change of $V_{out}$ per unit of linear displacement of the core 3. By constructing the bobbin wall so that its thickness and the skin depth of the bobbin wall material are properly related to the size and skin depth of the core 3, these two offsetting effects can be made to precisely cancel.

This is accomplished by a consideration of the following design parameters. The output voltage may be expressed as:

$$V_{out} = G(L_o - Bx) - V_{BAL} \quad 1.$$

wherein:
$L_o$ = transducer inductance when $x=0$
$G$ = gain constant in volts/henry
$B$ = inductance change per unit of axial displacement of core 3 in henries/cm
$x$ = displacement of core 3 in cm
$V_{BAL}$ = the voltage at Node 12 which also appears as $V_{out}$ if the transducer is shorted.

The scale factor F for the displacement measurement apparatus is equal to the product of GB and is proportional to the product of the magnetic field intensity and the area of the core. This may be stated as:

$$F = GB \sim HS \quad 2.$$

wherein:
F = scale factor in volts/cm
H = the magnetic field intensity on the axis of the transducer when the core is not present
S = the effective cross-sectional area of the core 3 after reduction of its physical cross-section by the skin depth.

Assuming that G is essentially independent of temperature, then from equation 2 by differentiation it may be stated that:

$$\frac{1}{F} \frac{dF}{dT} = \frac{1}{H} \frac{dH}{dT} + \frac{1}{S} \frac{dS}{dT} \quad 3.$$

From equation 3 it can be seen that change in the scale factor F as a function of temperature, which is dF/dT, can be made zero if the following is made true:

$$\frac{1}{H} \frac{dH}{dT} = \frac{-1}{S} \frac{dS}{dT} \quad 4.$$

This equality requires that the bobbin thickness and material is selected so that the increase in magnetic field intensity, which occurs as temperature increases, is directly proportional to the decrease in the effective cross-sectional area of the core as temperature increases in order that the two offset and cancel each other. The right side of equation 4 is known. It is positive because dS/dT is negative since S decreases with temperature.

If the wall thickness t of the bobbin 1 is made much smaller than the skin depth z in the material of which bobbin 1 is made, then from conventional field theory analysis it follows that dF/dT will be zero if the wall thickness of bobbin 1 satisfies the equation:

$$t = z\left[\left(\frac{-1}{S} \frac{dS}{dT}\right) \bigg/ \left(\frac{1}{z} \frac{dz}{dT}\right)\right] \quad 5.$$

Of course, dz/dT and z are available from conventional handbooks.

While certain preferred embodiments of the present invention have been disclosed in detail, it is to be understood that various modifications may be adopted without departing from the spirit of the invention or scope of the following claims.

I claim:

1. An improved displacement measurement apparatus having a main current conducting coil for attachment to a first one of two relatively movable bodies, an electrically conducting, non-ferromagnetic first wall in telescoping relationship to said coil and mounted to the second body for axial displacement relative to the main coil for varying their relative overlap and thereby vary the inductance of the coil; an AC electrical energy source which is connected to apply an AC signal to the coil at a frequency which is at least high enough that the skin depth of the first wall is less than the physical depth of the wall; and a detector circuit means connected to the coil for detecting a signal which is proportional to coil inductance, wherein the improvement comprises:
a bobbin wall interposed between the coil and said electrically conducting, non-ferromagnetic first wall, the bobbin wall formed of an electrically conducting, non-ferromagnetic material having a thickness which is small compared to the skin depth of the bobbin wall material at said frequency, said bobbin having a combination of wall thickness and a rate of change of skin depth as a function of temperature which combination causes the magnetic field intensity within the coil to vary as a function of temperature in inverse proportion to the change in the effective cross-sectional area of said first wall that results from changes in the skin depth of the first wall due to changes in temperature, said change in magnetic intensity reducing the net charge, as a function of temperature, in said detected signal.

2. An apparatus in accordance with claim 1 wherein said bobbin wall is tubular, the coil is wound upon the bobbin and said first electrically conducting, non-ferromagnetic wall is a core which slides within said bobbin wall.

3. An apparatus in accordance with claim 1 or 2 wherein the bobbin wall has a thickness substantially as defined by:

$$t = z\left[\frac{(-1)}{S} \frac{dS}{dT} \bigg/ \frac{(1)}{z} \frac{dz}{dT}\right]$$

wherein:
T = temperature;
z = skin depth of the bobbin material at the selected design operating frequency and at a temperature T; and
S = the axial cross-sectional area of a polygon having the same shape as the core but reduced in size by the skin depth at the selected design operating frequency and temperature.

4. An apparatus in accordance with claim 3 wherein said bobbin wall is constructed of stainless steel.

5. An apparatus in accordance with claim 1 or 2 wherein said bobbin wall is constructed of stainless steel.

6. An improved method for compensating a displacement measurement apparatus of the type having a main current conducting coil for attachment to a first one of two relatively movable bodies, an electrically conducting, non-ferromagnetic first wall in telescoping relationship to said coil and mounted to the second body for axial displacement into the main coil for varying their relative overlap and thereby vary the inductance of the coil; an AC electrical energy source which is connected to apply an AC signal to the coil at a frequency which is at least high enough that the skin depth of the first wall is less than the physical depth of the wall; and a detector circuit means connected to the coil for detecting a signal which is proportional to coil inductance, wherein the improvement comprises:

varying the field intensity within the coil as a monotonically increasing function of temperature in inverse proportion to variation in the effective cross-sectional area of the first wall as a function of temperature.

7. A method in accordance with claim 6 wherein the field intensity is varied by interposing an electrically conducting, non-ferromagnetic bobbin wall between the coil and said core having a thickness which is small compared to the skin depth of the bobbin wall material at said frequency, said bobbin having a combination of wall thickness and a rate of change of skin depth as a function of temperature which combination causes the magnetic field intensity within the coil to vary as a function of temperature in inverse proportion to the change in the effective cross-sectional area of said first wall that results from changes in the skin depth of the first wall due to changes in temperature, said change in magnetic intensity reducing the net change, as a function of temperature, in said detected signal.

* * * * *